United States Patent
Komatsu

[11] Patent Number: 6,008,866
[45] Date of Patent: Dec. 28, 1999

[54] VIDEO SIGNAL EDGE DETECTION CIRCUIT AND MOTION PROCESSING CIRCUIT

[75] Inventor: Yoshikazu Komatsu, Tokyo, Japan

[73] Assignee: NEC Corporation, Tokyo, Japan

[21] Appl. No.: 08/941,711

[22] Filed: Sep. 30, 1997

[30] Foreign Application Priority Data

Sep. 30, 1996 [JP] Japan ................... 8-259575

[51] Int. Cl.⁶ ..................................... H04N 5/21
[52] U.S. Cl. ............................. 348/701; 348/407
[58] Field of Search ..................... 348/700, 701, 348/699, 407, 402, 413, 416

[56] References Cited

U.S. PATENT DOCUMENTS

| | | | |
|---|---|---|---|
| 4,677,483 | 6/1987 | Dischert | 348/488 |
| 5,128,754 | 7/1992 | Dhein | 348/407 |
| 5,311,305 | 5/1994 | Mahadevan | 348/416 |
| 5,886,744 | 3/1999 | Hannah | 348/416 |

FOREIGN PATENT DOCUMENTS 3-220889  9/1991  Japan .

*Primary Examiner*—Howard Britton
*Attorney, Agent, or Firm*—Foley, Hoag & Eliot LLP

[57] ABSTRACT

The invention provides an edge detection circuit and a motion processing circuit which can prevent, upon motion detection between frames, erroneous detection at an edge portion, particularly a moving edge portion. A first edge detection section detects an edge of a pattern of an image provided by a first one of frames of a video signal and forwards a first edge detection signal. A second edge detection section detects the edge of the pattern of an image provided by a second one of the frames of the video signal at a time different from that of the first frame and forwards a second edge detection signal. An edge motion discrimination section receives the first and second edge detection signals and discriminates presence of absence of motion of the edge between the first and second frames based on the first and second edge detection signals. Consequently, any edge portion which exhibits motion between frames can be detected correctly.

25 Claims, 7 Drawing Sheets

VIDEO SIGNAL EDGE DETECTION CIRCUIT AND MOTION PROCESSING CIRCUIT

BACKGROUND OF THE INVENTION

1. Field of the Invention

This invention relates to a motion processing circuit for detecting and processing motion of an image provided by a video signal, and more particularly to an edge detection circuit for detecting presence or absence of motion of an edge provided by a video signal and a motion processing circuit which includes an edge detection circuit of the type mentioned.

2. Description of the Related Art

Generally, for color television signals of the NTSC system and the PAL system, a composite video signal which includes a brightness signal and a color signal for each frame is used. Further, for such a composite video signal as just mentioned, a technique of motion detection is used in order to efficiently effect decomposition of a brightness signal and a color signal (such decomposition will be hereinafter referred to as YC decomposition), noise reduction, double speed interpolation and signal compression processing.

According to the technique of motion detection, a variation (finite difference) between a current frame and a preceding frame is detected, and, based on presence or absence of such variation, a motion signal representative of whether or not there is motion between the frames is produced. By this technique, the adaptability of processing such as YC decomposition or signal compression processing mentioned above can be improved.

For example, in YC decomposition or double speed interpolation processing of the NTSC system, where an image exhibits a stationary state, a complete YC decomposition signal or interpolation signal can be obtained by inter-frame calculation and an image of a high quality can be obtained. On the other hand, in signal compression processing, where an image exhibits a stationary state, a signal of a preceding frame can be used as it is for a current frame, and consequently, the amount of signals to be transmitted can be reduced and the transmission band of the transmission signal can be made narrow. Accordingly, the technique of motion detection is a very important technique in video signal processing.

On the other hand, it is pointed out that, at an edge portion representative of a contour of a pattern on a screen, an error is likely to occur in detection of motion described above. Such erroneous detection is caused by crosstalk between a high brightness portion included in an edge component and a color signal portion, very small motion of a high brightness portion included in an edge component, and so forth. Of those factors, the crosstalk between a high brightness portion and a color signal portion arises from the fact that, while the brightness signal has a same phase between different frames, the color signal has opposite phases to each other between adjacent frames.

Since an edge portion includes crosstalk and very small motion in this manner, a motion adaptive YC decomposition circuit or a motion adaptive double speed conversion circuit which ignores an error upon motion detection at an edge portion has a drawback in that dot disturbance, cross color disturbance, fading of an image and so forth occur at an edge portion provided by a video signal, resulting in reproduction of an unbecoming image. Therefore, it is desirable to prevent erroneous detection of motion arising from very small motion at an edge portion.

A motion information signal detection circuit as a kind of motion processing circuit which prevents erroneous detection of motion at an edge portion is disclosed, for example, in Japanese Patent Laid-Open Application No. Heisei 3-220889. The motion information signal detection circuit disclosed in the document Just mentioned includes a motion detection circuit for detecting motion between frames from a video signal and outputting a motion signal, an edge detection circuit for discriminating an edge portion of a current frame and generating, when an edge portion is detected, an edge detection signal, and an adaptive processing circuit which is controlled in response to the edge detection signal. The edge detection circuit generates, if it detects an edge portion, an edge detection signal for a period of time corresponding to the detected edge portion, and forwards the edge detection signal as a masking signal to the adaptive processing circuit. Upon reception of the edge detection signal, the adaptive processing circuit attenuates the level of the motion signal from the motion detection circuit in accordance with the level of the edge detection signal.

Accordingly, the motion information signal detection circuit described above can eliminate erroneous detection of motion at an edge portion by either decreasing the level of or masking the motion signal at an edge portion in accordance with the level of the edge detection signal. This signifies that the motion signal is either decreased or substantially held from being outputted for a period of time of the edge portion provided for the duration of the edge detection signal, and consequently, very small motion between frames can be ignored. In other words, the conventional motion information signal detection circuit can prevent erroneous detection arising from very small motion at a stationary portion of a pattern.

However, where the construction of the motion information signal detection circuit described above is employed, also when an edge in a current frame exhibits a variation from that in the preceding frame over a time longer than the duration of the edge detection signal, that is, also when an edge portion actually exhibits motion, the edge detection signal is forwarded for each frame to the adaptive processing circuit. Consequently, although there actually is some motion between frames, an edge detection signal is forwarded to the adaptive processing circuit for each frame similarly as in the case wherein an image exhibits a stationary state, and an output for the edge portion of each frame is decreased or masked. Accordingly, although an edge portion exhibits motion between frames, the motion of the edge portion is ignored. This represents that, with the construction of the motion information signal detection circuit described above, such erroneous detection that motion is detected as a stationary state occurs.

Also it is possible to reduce erroneous detection at an edge portion to some degree by increasing, without using an edge detection circuit, the number of frames to be used for motion detection. However, as such number of frames increases, the number of frame memories, which are expensive, must be increased, which is not preferable for economy.

SUMMARY OF THE INVENTION

It is an object of the present invention to provide an economical edge detection circuit and motion processing circuit which can eliminate erroneous detection at an edge portion of a pattern of an image provided by a video signal.

It is another object of the present invention to provide an edge detection circuit and a motion processing circuit which can prevent such erroneous detection that motion is discriminated as a stationary state and can prevent also such erroneous detection as arises from very small portion where an image exhibits a stationary state.

In order to attain the objects described above, according to the present invention, it is detected and discriminated whether or not an edge of a pattern of an image provided by a frame of a video signal exhibits some motion from the edge of the pattern of another image provided by a preceding frame of the video signal, thereby eliminating such erroneous discrimination that a moving edge is discriminated as a stationary edge.

More particularly, according to an aspect of the present invention, there is provided an edge detection circuit which receives a video signal which can be divided into a series of frames and detects an edge portion of a pattern of an image provided by the video signal, comprising first edge detection means for detecting an edge of a pattern of an image provided by a first one of the frames of the video signal and forwarding a first edge detection signal, second edge detection means for detecting the edge of the pattern of an image provided by a second one of the frames of the video signal at a time different from that of the first frame and forwarding a second edge detection signal, and edge motion discrimination means for receiving the first and second edge detection signals and discriminating presence of absence of motion of the edge between the first and second frames based on the first and second edge detection signals.

According to another aspect of the present invention, there is provided an edge detection circuit which receives a video signal which can be divided into a series of frames and detects an edge portion of a pattern of an image provided by the video signal, comprising edge detection means for detecting an edge of a pattern of an image provided by one of the frames of the video signal and forwarding a first edge detection signal, delay means for delaying the first edge detection signal by one frame and outputting the delayed first edge detection signal as a second edge detection signal, and edge motion discrimination means for receiving the first and second edge detection signals and discriminating presence of absence of motion of the edge between the first and second frames based on the first and second edge detection signals.

The delay means may be a frame memory.

In both of the edge detection circuits, the edge motion discrimination means may be an AND circuit for logically ANDing the first and second edge detection signals.

According to a further aspect of the present invention, there is provided a motion processing circuit which receives a video signal which can be divided into a series of frames, detects motion of an image provided by the video signal and produces a motion signal, comprising, in addition to any of the edge detection circuits described above, adaptive processing means for controlling outputting of the motion signal in accordance with a result of the discrimination of the edge motion discrimination means.

With the edge detection circuits and the motion processing circuit of the present invention, discrimination regarding an edge is performed over a plurality of frames. Consequently, erroneous detection of an edge which arises in discrimination of an edge from a single frame can be prevented, and a correct motion signal can be obtained. Further, since erroneous detection of an edge is prevented, dot disturbance, cross color disturbance, fading of an image and so forth can be eliminated.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
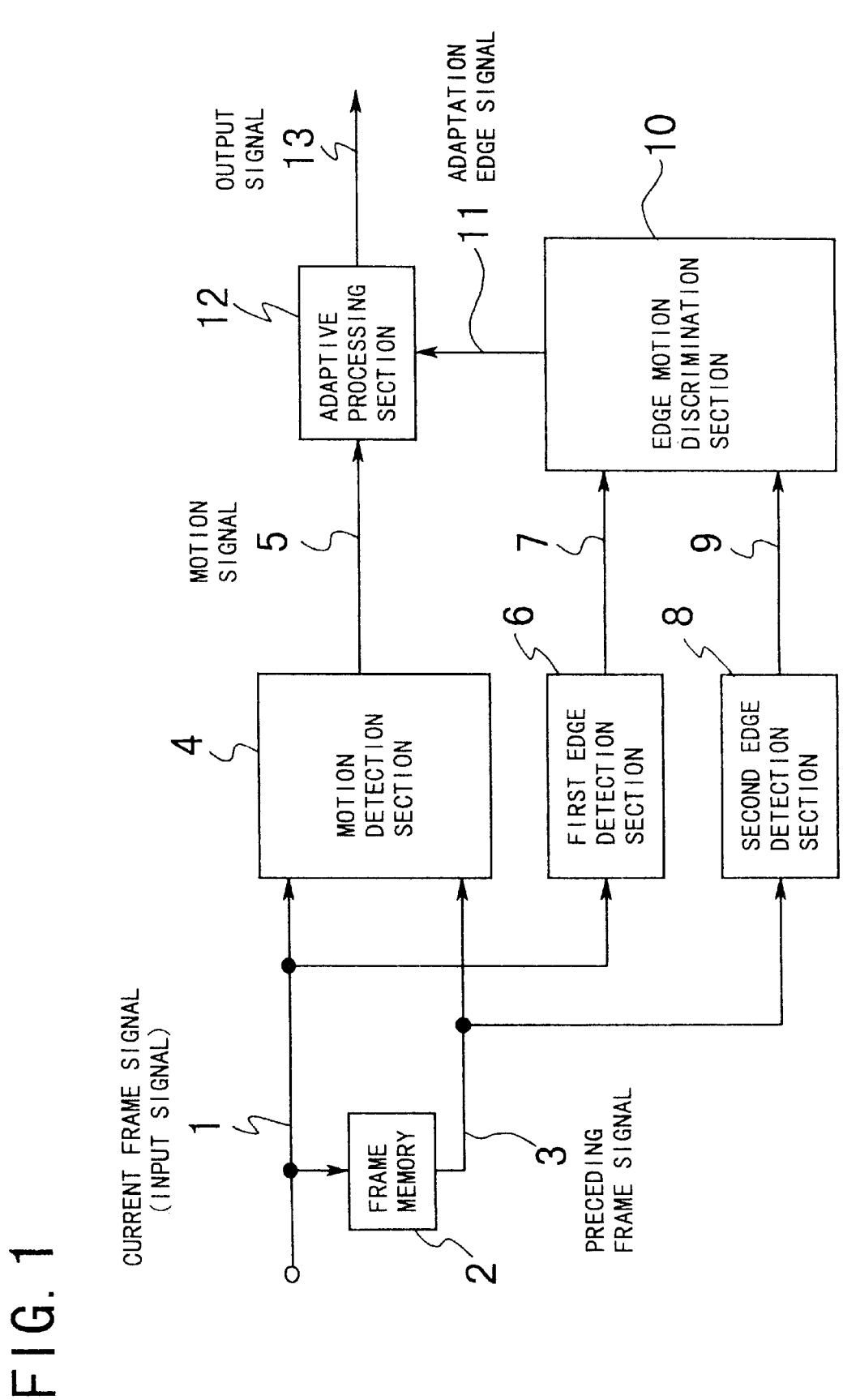
FIG. 1 is a block diagram showing a motion processing circuit to which the present invention is applied.

Referring first to FIG. 1, there is shown a motion processing circuit to which the present invention is applied. The motion processing circuit includes an edge detection circuit to which the present invention is applied. The edge detection circuit includes a frame memory 2, a first edge detection section 6, a second edge detection section 8 and an edge motion discrimination section 10. The motion processing circuit includes, in addition to the edge detection circuit, a motion detection section 4 and an adaptive processing section 12. The edge detection circuit receives an input signal 1 formed from, for example, a composite video signal of the NTSC system. Accordingly, the input signal 1 has frames including a brightness signal (Y) and a color signal (C). While the input signal 1 is actually given in the form of a digital signal, it is assumed, for simplified description, that the input signal 1 is in the form of an analog signal. Anyway, an output signal 13 obtained by motion detection processing is outputted from the motion processing circuit shown in FIG. 1.

In FIG. 1, the input signal 1 is supplied as a current frame signal to the frame memory 2 and the motion detection section 4 and also to the first edge detection section 6. The frame memory 2 stores the current frame signal for one frame and outputs the stored frame signal as a preceding frame signal 3, which corresponds to the immediately preceding frame to the current frame, to the motion detection section 4.

Figure 2:
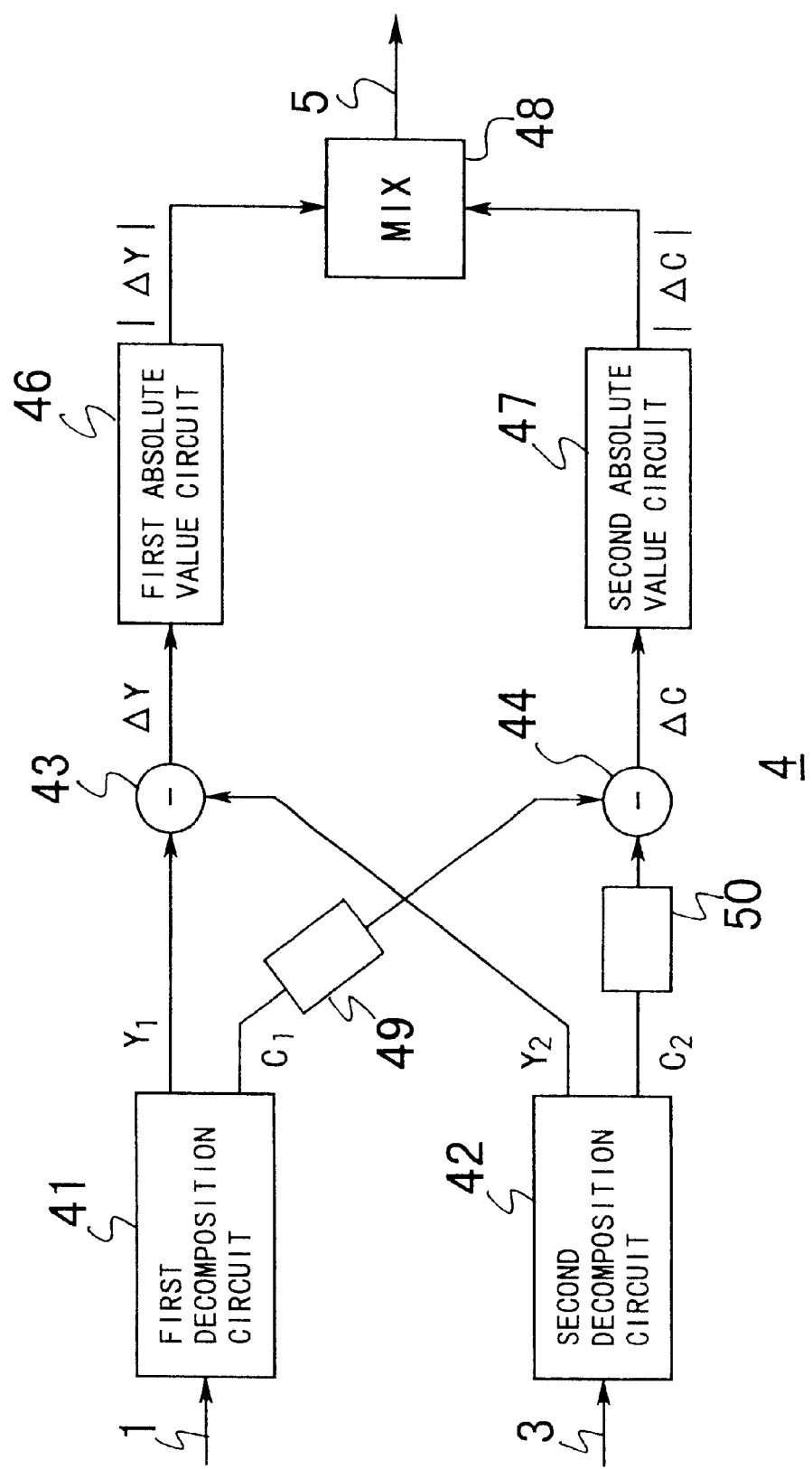
FIG. 2 is a block diagram showing an exemplary construction of a motion detection section of the motion processing circuit of FIG. 1.

Referring to FIGS. 1 and 2, the motion detection section 4 produces a motion signal 5 from the current frame signal 1 and the preceding frame signal 3. To this end, the motion detection section 4 includes a first decomposition circuit 41 for decomposing a first brightness signal Y1 and a first color signal C1 from the current frame signal 1, and a second decomposition circuit 42 for decomposing a second brightness signal Y2 and a second color signal C2 from the preceding frame signal 3. Each of the first and second decomposition circuits 41 and 42 is formed from a Y/C decomposition circuit, for which any known Y/C decomposition circuit can be used.

The first and second brightness signals Y1 and Y2 are supplied to a first subtraction circuit 43, from which a brightness finite difference signal ΔY representative of a finite difference between them is outputted. On the other hand, the first and second color signals C1 and C2 are supplied to absolute value circuits 49 and 50, by which absolute values of them are calculated. The absolute values are supplied to a second subtraction circuit 44, from which a color finite difference signal ΔC representative of a finite difference between them is outputted. The absolute value circuits 49 and 50 are provided taking it into consideration that the color signals C1 and C2 exhibit opposite phases to each other between frames.

The brightness finite difference signal ΔY and the color finite difference signal ΔC described above are supplied to first and second absolute value circuits 46 and 47, by which calculation of absolute values of the brightness finite difference signal ΔY and the color finite difference signal ΔC is performed, respectively. As a result, first and second absolute value signals |ΔY| and |ΔC| are outputted from the first and second absolute value circuits 46 and 47, respectively. The first and second absolute value signals |ΔY| and |ΔC| represent amounts of motion between the current frame and the preceding frame of the brightness signal Y and the color signal C, respectively.

The first and second absolute value signals |ΔY| and |ΔC| are mixed with each other by a mixer circuit 48 to produce a motion signal 5, which is supplied to the adaptive processing section 12 (FIG. 1). Here, the adaptive processing section 12 is formed from a switch circuit which is switched on or off in response to an adaptation edge signal 11 which will be hereinafter described.

Referring back to FIG. 1, the current frame signal 1 is provided to the first edge detection section 6 as described hereinabove. The first edge detection section 6 thus detects an edge portion provided by the current frame signal 1 using a known method, and forward a first edge detection signal 7 in the form of a pulse signal for a predetermined time including the point of time of detection. The forwarding time of the first edge detection signal 7 described above may be a period of time corresponding to 3 to 7 samples of the input signal 1 in the form of a digital signal. This signifies that, taking it into consideration that error detection relating to an edge may possibly occur successively over several samples, the masking width for a decompression circuit provided in the first edge detection section 6 is expanded.

Meanwhile, the preceding frame signal 3 is supplied not only to the motion detection section 4 but also to the second edge detection section from the frame memory 2. The edge motion discrimination section 10 is connected to the first and second edge detection sections 6 and 8. The second edge detection section 8 detects an edge portion provided by the preceding frame signal 3 in a similar manner as in the first edge detection section 6 and sends out a second edge detection signal 9 to the edge motion discrimination section 10.

The edge motion discrimination section 10 outputs an adaptation edge signal to the adaptive processing section 12 only during a period of time during which the first and second edge detection signals 7 and 9 remain coincident with each other. Accordingly, the edge motion discrimination section 10 may be formed from an AND circuit which logically ANDs the first and second edge detection signals 7 and 9.

Operation of the motion processing circuit shown in FIG. 1 is described below with additional reference to FIG. 3. First, in FIG. 3, the current frame signal 1 and the preceding frame signal 3 are divided into first to third periods a to c. Here, for simplified description, description is given only of the brightness signal Y. However, the description similarly applies to the color signal C.

Figure 3:
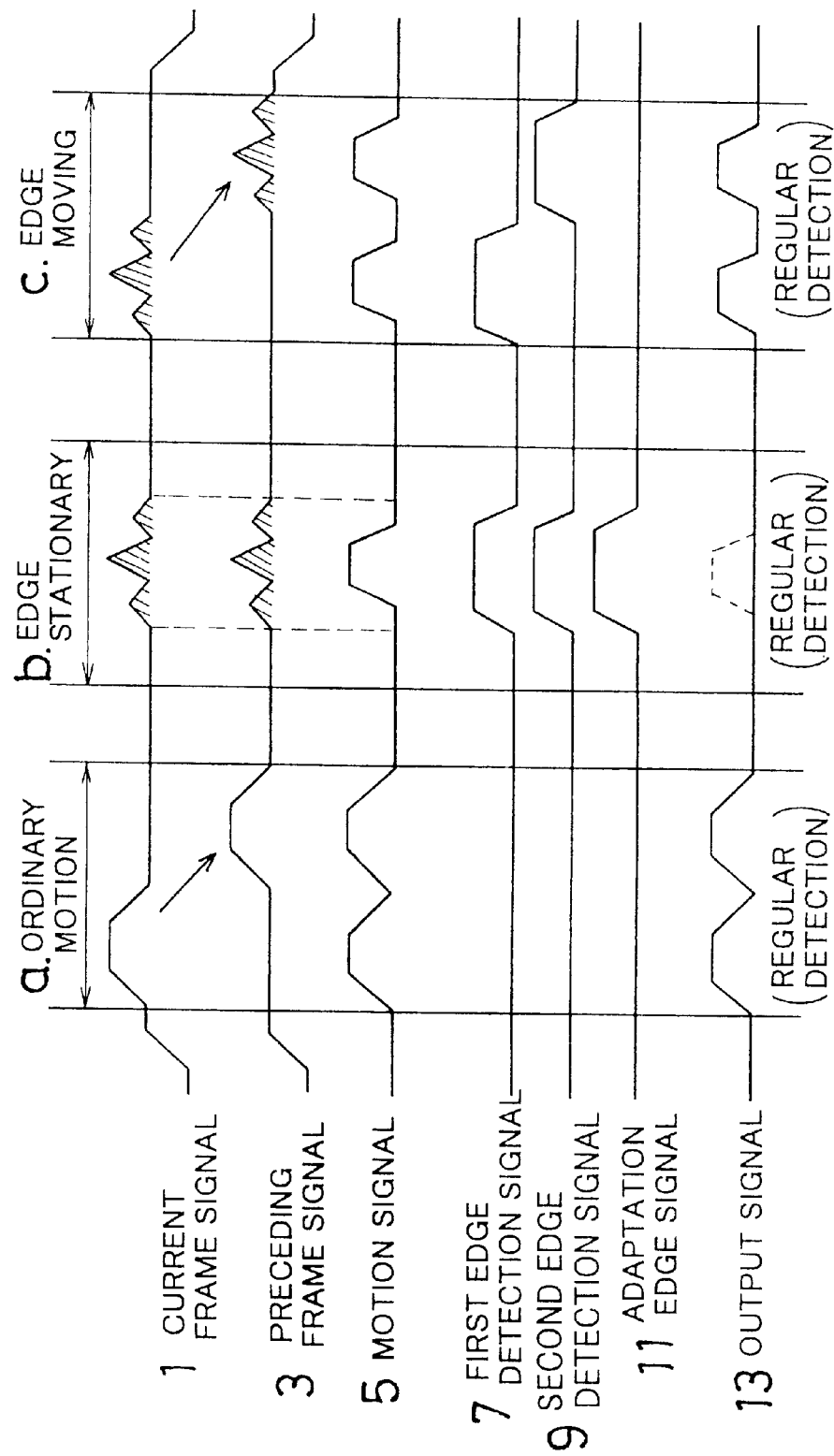
FIG. 3 is a time chart illustrating operation of the motion processing circuit of FIG. 1.

Of the periods illustrated in FIG. 3, the first period a includes no edge portion in any of the current frame signal 1 and the preceding frame signal 3. Within the first period a, since none of the first and second edge detection sections 6 and 8 detects any edge portion, they does not output the first and second edge detection signals 7 and 9, respectively. Within the first period a, since no erroneous detection occurs in motion detection, the motion detection section 4 outputs a signal representative of actual motion as the motion signal 5.

In the second period b, an edge portion is present at same locations of the current frame signal 1 and the preceding frame signal 3, that is, at locations overlapping with each other in time, and the edge is stationary. In this instance, the first and second edge detection sections 6 and 8 detect the edge portions provided by the current frame signal 1 and the preceding frame signal 3 and output first and second edge detection signals 7 and 9, respectively, as seen from FIG. 3.

In FIG. 3, however, it is illustrated that the motion detection section 4 malfunctions within the second period b. Although actually no motion is exhibited between the two frame signals 1 and 3, since the finite difference signal ΔY between them is not equal to zero, the motion detection section 4 outputs a motion signal 5 as seen in FIG. 3. In this manner, also when the motion detection section 4 malfunctions, the first and second edge detection signals 7 and 9 are forwarded from the first and second edge detection sections 6 and 8 to the edge motion discrimination section 10, respectively. Since the output timings of the two edge detection signals 7 and 9 are coincident in time with each other, the result of discrimination of the edge motion discrimination section 10 based on logical ANDing of the two edge detection signals 7 and 9 exhibits a high level. Consequently, the edge motion discrimination section 10 outputs a signal of a high level as the adaptation edge signal 11 to the adaptive processing section 12. Since the adaptive processing section 12 attenuates or masks the motion signal 5 during a period within which the adaptation edge signal 11 remains at the high level, a signal of a regular level, that is, a signal of the zero level, is outputted as indicated by a solid line in FIG. 3 as the output signal 13. Accordingly, from the motion processing circuit, such an erroneous motion signal as indicated by a broken line in FIG. 3 is not outputted as an output signal at all even if the motion detection section 4 malfunctions.

In this manner, with the motion processing circuit of FIG. 1, it can be prevented that an edge portion which actually is in a stationary state is discriminated as a moving edge portion in error.

During the third period c illustrated in FIG. 3, it is illustrated that an edge portion actually exhibits motion between the current frame signal 1 and the preceding frame signal 3.

Here, a case wherein only the first edge detection section 6 for detecting an edge portion provided by the current frame signal 1 is provided is considered. The first edge detection section 6 outputs an adaptation edge signal at an edge portion provided by each frame of the current frame signal 1. Consequently, the two motion signals 5 illustrated in the third period c are attenuated by respective adaptation edge signals, and consequently, such an output signal 13 as shown in FIG. 3 is not obtained.

On the other hand, in the motion processing circuit of FIG. 3 wherein first and second edge detection signals 7 and 9 are extracted from a current frame signal 1 and a preceding frame signal 3 by the first and second edge detection sections 6 and 8, respectively, the first and second edge detection signals 7 and 9 are outputted at different timings from each other to the edge motion discrimination section 10. Since the edge motion discrimination section 10 logically ANDs the two edge detection signals 7 and 9 as described above, the level of the adaptation edge signal 11 of the motion discrimination section 10 remains at the low level. Consequently, in the adaptive processing section 12, the motion signal 5 is not attenuated by or masked with the adaptation edge signal 11 and is sent out as an output signal 13 as seen in FIG. 3. In this manner, where the construction of the motion processing circuit of FIG. 1 is employed, when motion is actually exhibited between frames, the motion signal 5 is not attenuated or masked, and a correct output signal is forwarded.

Figure 4:
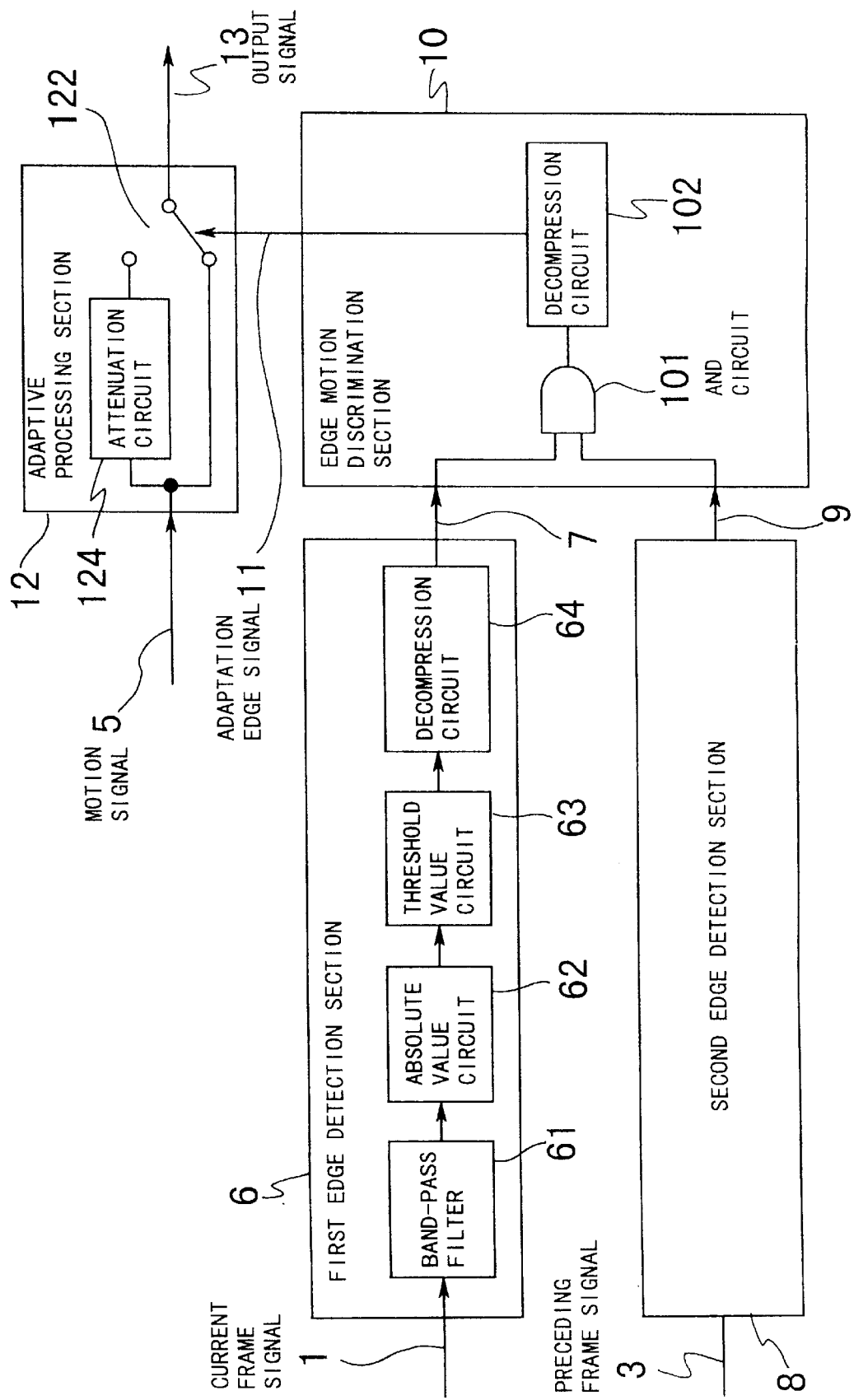
FIG. 4 is a block diagram showing a detailed construction of part of the motion processing circuit of FIG. 1.

FIG. 4 shows a detailed construction of the first edge detection section 6, edge motion discrimination section 10 and adaptive processing section 12 of the motion processing circuit shown in FIG. 1. It is to be noted that, since the second edge detection section 8 can be realized with the same construction as that of the first edge detection section 6, it is omitted in FIG. 4.

Referring to FIG. 4, the first edge detection section 6 includes a band-pass filter 61 for extracting an edge component representative of an edge portion from the current frame signal 1. Generally, since sudden variations of the brightness signal Y and color signal C are exhibited at an edge portion of a pattern of an image, an edge component can be extracted by extracting a variation in frequency components involved in such variations. An edge component extracted by the band-pass filter 61 is supplied to an absolute value circuit 62, by which normalization of the edge component including a negative component is performed, and the normalized edge component is supplied to a threshold value circuit 63. The threshold value circuit 63 compares the normalized edge component with a predetermined threshold value and determines the edge component as an edge if the edge component is higher than the fixed value, and forwards a pulse signal of 1 bit to a decompression circuit 64. The decompression circuit 64 decompresses the pulse signal to produce a first edge detection signal 7 which continues for a fixed period of time including the time of the detection of the edge to the edge motion discrimination section 10.

Also the second edge detection section 8 produces a second edge detection signal 9 from the preceding frame signal 3 in a similar manner and outputs the second edge detection signal 9 to the edge motion discrimination section 10.

The edge motion discrimination section 10 shown in FIG. 4 includes an AND circuit 101 for logically ANDing the first and second edge detection signals 7 and 9, and a decompression circuit 102. The AND circuit 101 outputs a logic value "1" while the first and second edge detection signals 7 and 9 remain coincident with each other. The decompression circuit 102 decompresses the output of the AND circuit 101 and sends out a resulting signal as an adaptation edge signal 11 to the adaptive processing section 12. It is to be noted that, where such decompression circuit 64 is provided in the first and second edge detection sections 6 and 8, the decompression circuit 102 of the edge motion discrimination section 10 may be omitted.

Further, the adaptive processing section 12 which is controlled by the adaptation edge signal 11 includes an attenuation circuit 124 for attenuating the motion signal 5, and a switch 122 for switching the motion signal 5 and an output of the attenuation circuit 124 in response to the adaptation edge signal 11. The switch 122 shown in FIG. 4 passes the motion signal 5 as it is therethrough when the adaptation edge signal 11 has a logic value "0", but when the adaptation edge signal 11 has the other logic value "1", the switch 122 switchably passes the output of the attenuation circuit 124 which has attenuated the motion signal 5. By such switching, the operation described hereinabove with reference to FIG. 3 can be achieved.

Figure 5:
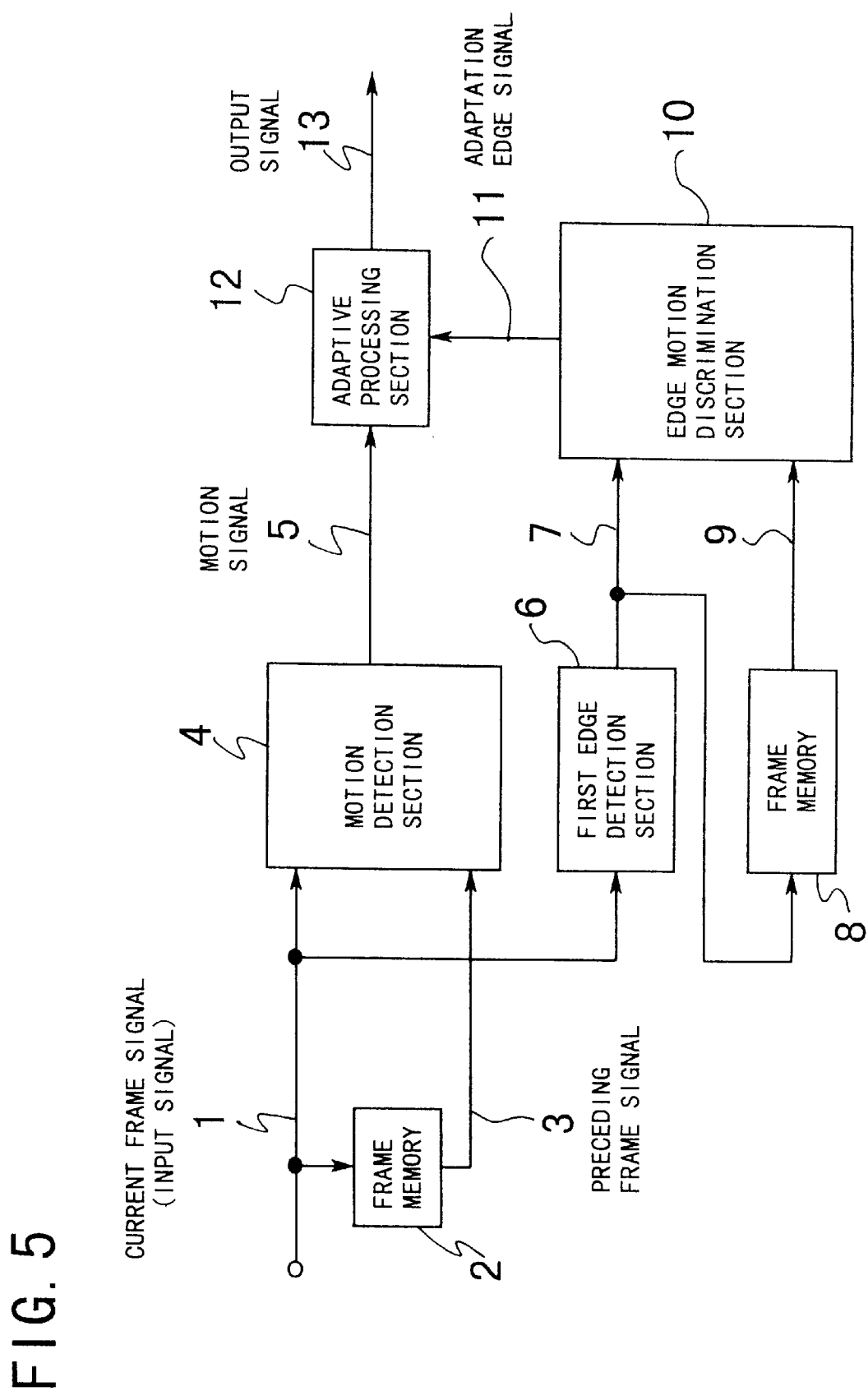
FIGS. 5 to 7 are block diagrams showing different modifications to the motion processing circuit of FIG. 1.

Referring now to FIG. 5, there is shown a modification to the motion processing circuit described hereinabove with reference to FIG. 1. The modified motion processing circuit is different from the motion processing circuit of FIG. 1 in that it includes, in place of the second edge detection section 8, a frame memory 8' as delaying means for delaying the first edge detection signal 7 obtained by the first edge detection section 6 by one frame. In the modified motion processing circuit, the first edge detection signal 7 from the current frame signal is directly supplied from the first edge detection section 6 to the edge motion discrimination section 10 while the second edge detection signal 9 obtained by delaying the first edge detection signal 7 by means of the frame memory 8' is outputted to the edge motion discrimination section 10. Also the modified motion processing circuit operates in a similar manner as in the motion processing circuit of FIG. 1.

Since the frame memory 8' employed in the modified motion processing circuit of FIG. 5 merely delays the first edge detection signal 7 of 1 bit or 2 to 3 bits detected by the first edge detection section 6 by one frame, it may be formed from a memory having a storage capacity smaller than that of the frame memory 2 used for motion detection. Accordingly, also with the modified motion processing circuit, increase of the used amount of the frame memory can be suppressed to the minimum.

Further, in motion detection, it sometimes occurs that the detection sensitivity for a particular band such as a color signal band is decreased. If the sensitivity for a particular band is decreased, then erroneous detection in the particular band may possibly matter. To such a case, the present invention can be applied by using the first and second edge detection sections 6 and 8 as detection circuits for the particular band for which the sensitivity is decreased. In this instance, since the sensitivity decreases only when an edge by the particular band exhibits a stationary state, there is an advantage in that erroneous detection is decreased.

While the motion processing circuit described hereinabove with reference to FIG. 1 performs edge detection based on two adjacent frames, frames to be used for edge detection need not necessarily be adjacent each other, or edge detection may be performed based on three or more frames. Where edge detection is performed based on three or more frames, an edge may be determined only when a plurality of edges coincide with each other.

Figure 6:
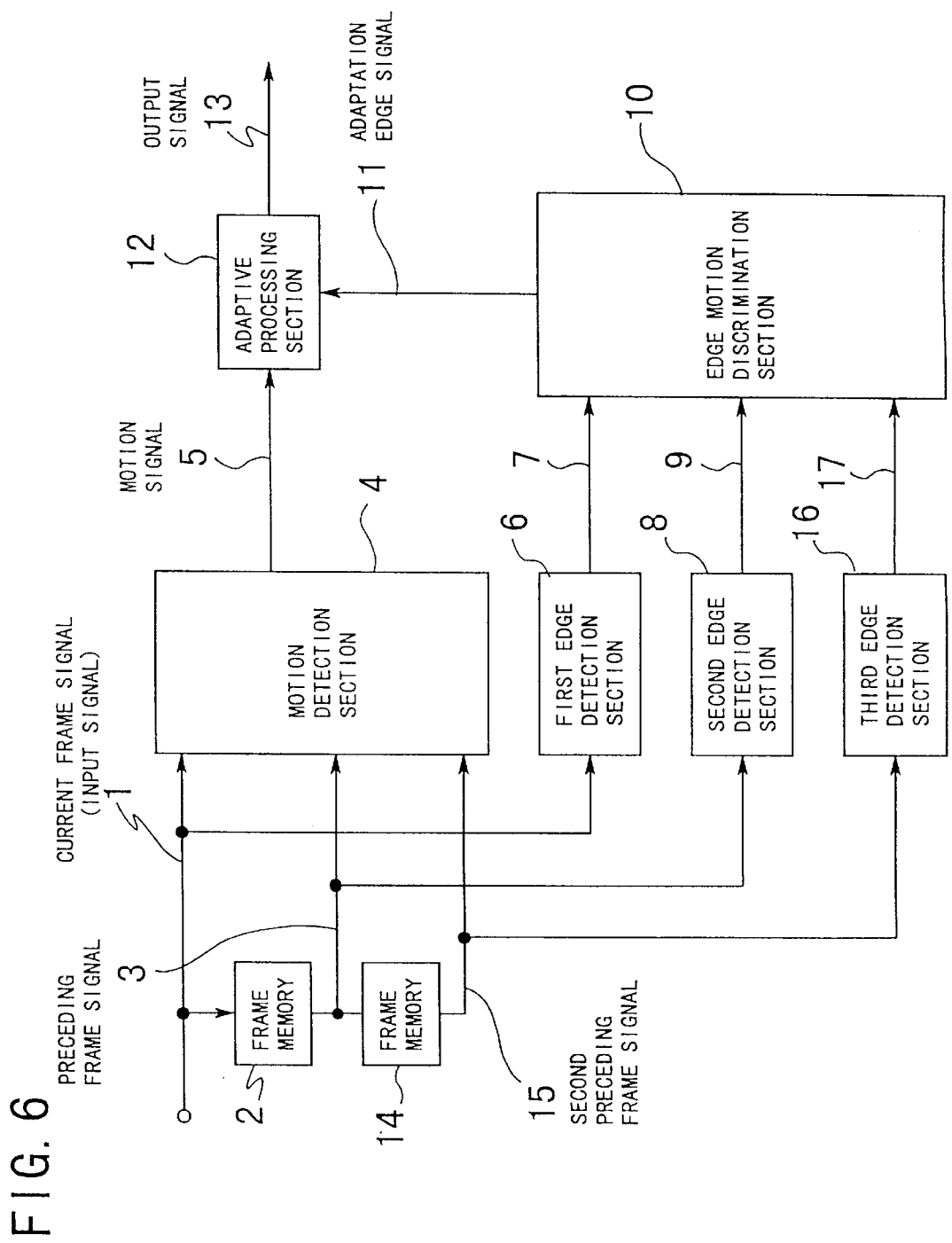

Referring now to FIG. 6, there is shown another modification to the motion processing circuit described hereinabove with reference to FIG. 1. The present modified motion processing circuit is different from the motion processing circuit of FIG. 1 in that it additionally includes another frame memory 14 connected to the frame memory 2 and a third edge detection section 16 for detecting an edge from an output signal of the frame memory 14. In the present modified motion processing circuit, a frame signal 15 of a frame preceding by two frames to a current frame is supplied from the frame memory 14 to the third edge detection section 16, and the third edge detection section 16 detects an edge of the frame signal of the frame preceding by two frames in a similar manner to those by the first and second edge detection sections 6 and 8 and forwards a result of the detection as a third edge detection signal 17 to the edge motion discrimination section 10. The edge motion discrimination section 10 discriminates presence or absence of motion of the video signal from among the three frames from the first to third edge detection signals 7, 9 and 17, and outputs, when the three edges detected then coincide with one another, an adaptation edge signal 11 to the adaptive processing section 12.

Figure 7:
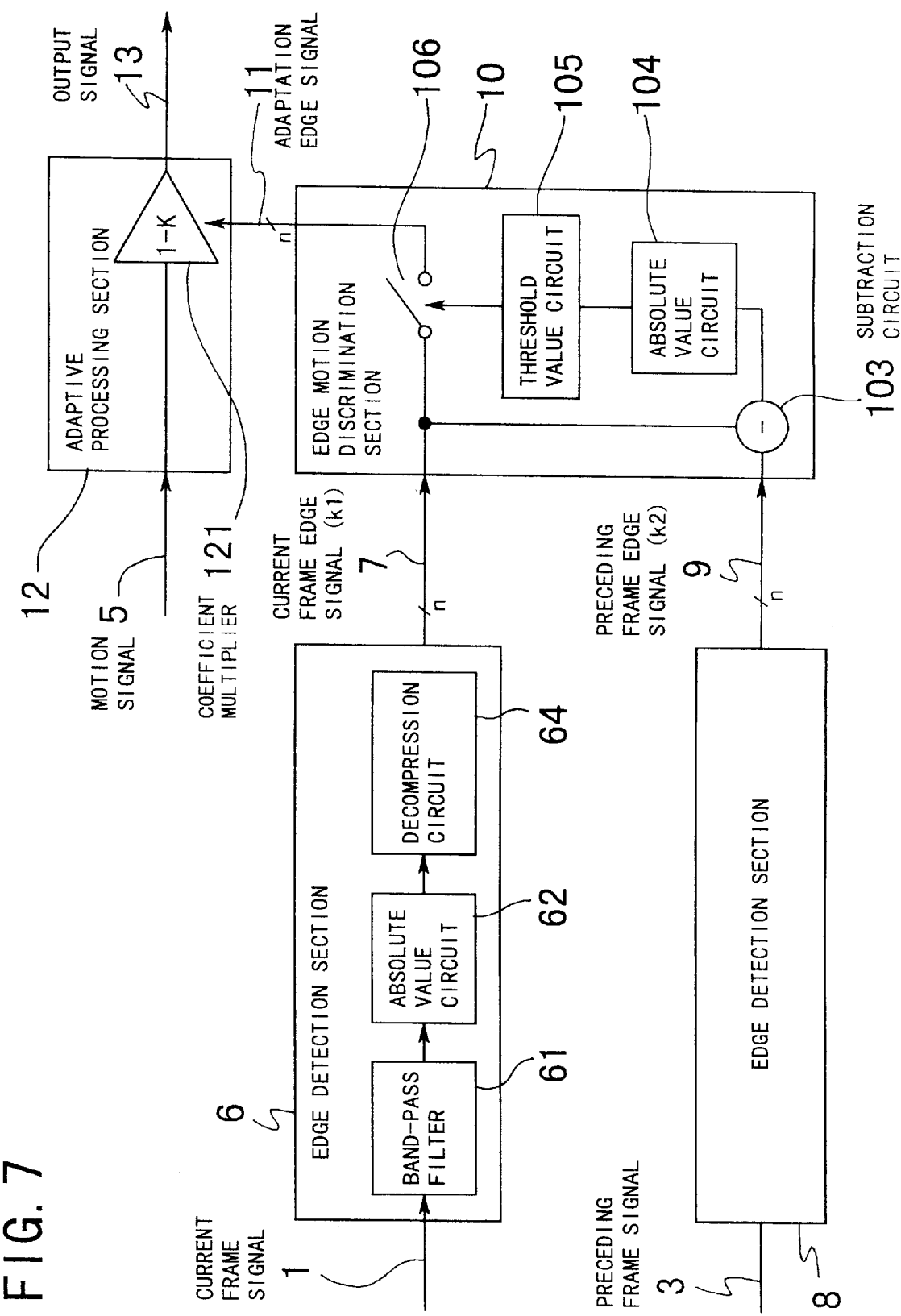

Referring now to FIG. 7, there is shown a further modification to the motion processing circuit described hereinabove with reference to FIG. 1. The present modified motion processing circuit is different from the motion processing circuit of FIG. 1 in that the edge motion discrimination section 10 detects a correlation between the first and second edge detection signals 7 and 9 supplied thereto from the first and second edge detection sections 6 and 8 and outputs a resulting signal to the adaptation edge signal 11. In this instance, the first and second edge detection sections 6 and 8 are constructed such that, as apparent also from comparison with FIG. 4, the output of the absolute value circuit 62 is not passed through the threshold value circuit 63 but is directly supplied to the maximum value decompression circuit 64. Here, the first edge detection signal 7 produced by the first edge detection section 6 is a multiple value signal of the n-bit width whose level varies in response to the magnitude of an edge. Also the second edge detection signal 9 produced by the second edge detection section 8 having a similar construction is a multiple value signal of the n-bit width.

The edge motion discrimination section 10 which receives the first and second edge detection signals 7 and 9 having the n-bit width includes a subtraction circuit 103, an absolute value circuit 104 and a threshold value circuit 105, and detects a correlation between the first edge detection signal 7 representative of an edge of a current frame and the second edge detection signal 9 representative of an edge of a preceding frame and outputs a result of the detection as an adaptation edge signal 11. More particularly, the subtraction circuit 103 calculates a finite difference in edge level between the current frame and the a preceding frame. The finite difference is normalized by the absolute value circuit 104. The absolute value of the normalized finite difference is outputted to the threshold value circuit 105.

In this instance, if the absolute value of the finite difference is lower than a threshold value representative of a fixed value, then the threshold value circuit 105 determines that there is a correlation between the first and second edge detection signals 7 and 9, and closes a switch 106. Consequently, the first edge detection signal 7 of n bits is outputted as it is as an adaptation edge signal 11. On the other hand, if the absolute value of the finite difference is equal to or higher than the threshold value, then the threshold value circuit 105 determines that there is no correlation between the first and second edge detection signals 7 and 9 and opens the switch 106. Consequently, the edge detection signal is intercepted, and the adaptation edge signal 11 maintains a state of zero.

The adaptive processing section 12 is formed from a coefficient multiplier 121 which handles the adaptation edge signal 11 as an attenuation coefficient k (k=0 to 1) and attenuates the motion signal 5 inputted thereto in accordance with the coefficient, and forwards an output signal 13 represented by 1-k. Accordingly, with the present modified motion processing circuit having the construction described above, a motion signal is attenuated adaptively in accordance with the magnitude of an edge. Further, when an edge exhibits motion between frames or when an edge exhibits a variation in magnitude thereof, since the edge signal is intercepted based on detection of a correlation between the two edges, the motion signal is outputted without being attenuated.

Having now fully described the invention, it will be apparent to one of ordinary skill in the art that many changes and modifications can be made thereto without departing from the spirit and scope of the invention as set forth herein.

What is claimed is:

1. An edge detection circuit which receives a video signal which can be divided into a series of frames and detects an edge portion of a pattern of an image provided by the video signal, comprising:

first edge detection means for detecting an edge of a pattern of an image provided by a first one of the frames of the video signal and forwarding a first edge detection signal;

second edge detection means for detecting the edge of the pattern of an image provided by a second one of the frames of the video signal at a time different from that of the first frame and forwarding a second edge detection signal; and edge motion discrimination means for receiving the first and second edge detection signals and discriminating presence of absence of motion of the edge between the first and second frames based on the first and second edge detection signals.

2. An edge detection circuit as claimed in claim 1, wherein the second frame precedes in time to the first frame.

3. An edge detection circuit as claimed in claim 2, wherein the second frame directly precedes to the first frame.

4. An edge detection circuit as claimed in claim 1, wherein said edge motion discrimination means is an AND circuit for logically ANDing the first and second edge detection signals.

5. An edge detection circuit which receives a video signal which can be divided into a series of frames and detects an edge portion of a pattern of an image provided by the video signal, comprising:

edge detection means for detecting an edge of a pattern of an image provided by one of the frames of the video signal and forwarding a first edge detection signal;

delay means for delaying the first edge detection signal by one frame and outputting the delayed first edge detection signal as a second edge detection signal; and edge motion discrimination means for receiving the first and second edge detection signals and discriminating presence of absence of motion of the edge between the first and second frames based on the first and second edge detection signals.

6. An edge detection circuit as claimed in claim 5, wherein said delay means is a frame memory.

7. An edge detection circuit as claimed in claim 5, wherein said edge motion discrimination means is an AND circuit for logically ANDing the first and second edge detection signals.

8. A motion processing circuit which receives a video signal which can be divided into a series of frames, detects motion of an image provided by the video signal and produces a motion signal, comprising:

first edge detection means for detecting an edge of a pattern of an image provided by a first one of the frames of the video signal and forwarding a first edge detection signal;

second edge detection means for detecting the edge of the pattern of an image provided by a second one of the frames of the video signal at a time different from that of the first frame and forwarding a second edge detection signal;

edge motion discrimination means for receiving the first and second edge detection signals and discriminating presence of absence of motion of the edge between the first and second frames based on the first and second edge detection signals; and adaptive processing means for controlling outputting of the motion signal in accordance with a result of the discrimination of said edge motion discrimination means.

9. A motion processing circuit as claimed in claim 8, wherein the second frame precedes in time to the first frame.

10. A motion processing circuit as claimed in claim 9, wherein the second frame directly precedes to the first frame.

11. A motion processing circuit as claimed in claim 8, wherein said edge motion discrimination means is an AND circuit for logically ANDing the first and second edge detection signals.

12. A motion processing circuit which receives a video signal which can be divided into a series of frames, detects motion of an image provided by the video signal and produces a motion signal, comprising:

edge detection means for detecting an edge of a pattern of an image provided by one of the frames of the video signal and forwarding a first edge detection signal;

delay means for delaying the first edge detection signal by one frame and outputting the delayed first edge detection signal as a second edge detection signal;

edge motion discrimination means for receiving the first and second edge detection signals and discriminating presence of absence of motion of the edge between the first and second frames based on the first and second edge detection signals; and adaptive processing means for controlling outputting of the motion signal in accordance with a result of the discrimination of said edge motion discrimination means.

13. A motion processing circuit as claimed in claim 12, wherein said delay means is a frame memory.

14. A motion processing circuit as claimed in claim 12, wherein said edge motion discrimination means is an AND circuit for logically ANDing the first and second edge detection signals.

15. A motion processing circuit, comprising:

(a) a first frame memory that receives an input frame signal and outputs a first preceding frame signal corresponding to a previous value of the input frame signal;

(b) a motion detection section that outputs a motion signal that varies according to differences between the input frame signal and the first preceding frame signal;

(c) a first edge detection section that detects a first edge in the input frame signal;

(d) a second edge detection section that detects a second edge in the first preceding frame signal;

(e) an edge motion discrimination section that asserts an adaptation edge signal in response to the edge detection sections detecting the first and second edges; and (f) an adaptive processing section that outputs the motion signal and that attenuates the motion signal according to the adaptive edge signal.

16. A motion processing circuit, according to claim 15, wherein the second edge detection section is coupled to the frame memory.

17. A motion processing circuit, according to claim 15, wherein the second edge detection section is coupled to the first edge detection section.

18. A motion processing circuit, according to claim 15, wherein the previous value of the frame signal contained in the frame memory corresponds to a frame immediately preceding a frame corresponding to the input frame signal.

19. A motion processing circuit, according to claim 15, further comprising:

(g) a second frame memory, coupled to the first preceding frame signal, the second frame memory outputting a second preceding frame signal corresponding to a previous value of the first preceding frame signal; and (h) a third edge detection section that detects a third edge in the second preceding frame signal, wherein the edge motion discrimination section asserts the adaptation edge signal in response to the edge detection section detecting the first, second, and third edges and wherein the motion detection section outputs a motion signal that varies according to differences between the input frame signal, the first preceding frame signal, and the second preceding frame signal.

20. A motion processing circuit, according to claim 15, wherein the first and second edge detection sections output numeric values corresponding to values of the first and second edges and wherein attenuation of the motion signal varies according to the numeric values.

21. A method of detecting motion in a video signal, comprising:

(a) sensing a difference between a first frame and a second frame of the video signal;

(b) detecting a first edge in the first frame;

(c) detecting a second edge in the second frame; and (d) providing an output signal that varies according to the difference between the first and second frames, wherein the output signal is attenuated in response to the first and second edges being detected.

22. A method of detecting motion in a video signal, according to claim 21, wherein detecting the second edge including using a previous value of the first edge.

23. A method of detecting motion in a video signal, according to claim 21, wherein sensing the difference between the first and second frames includes storing the second frame in a frame memory and comparing components of the first and second frames.

24. A method of detecting motion in a video signal, according to claim 21, further comprising:

(e) sensing an other difference between a third frame and the first and second frames; and (f) detecting a third edge in the third frame, wherein the output signal varies according to the other difference and wherein the output signal is attenuated in response to the first, second, and third edges being detected.

25. A method of detecting motion in a video signal, according to claim 21, wherein detecting the first and second edges includes providing numeric values corresponding to an absolute value of the edges and wherein attenuation of the output varies according to the numeric values.

* * * * *